United States Patent
Kulaga et al.

(10) Patent No.: US 12,079,335 B2
(45) Date of Patent: Sep. 3, 2024

(54) SYSTEM CONTEXT DATABASE MANAGEMENT

(71) Applicant: Acronis International GmbH, Schaffhausen (CH)

(72) Inventors: Andrey Kulaga, Istanbul (TR); Danil Cherepanov, Istanbul (TR); Nikolay Grebennikov, Singapore (SG); Serguei Beloussov, Schaffhausen (CH); Stanislav Protasov, Schaffhausen (CH)

(73) Assignee: Acronis International GmbH, Schaffhausen (CH)

( * ) Notice: Subject to any disclaimer, the term of this patent is extended or adjusted under 35 U.S.C. 154(b) by 340 days.

(21) Appl. No.: 17/444,180

(22) Filed: Jul. 30, 2021

(65) Prior Publication Data

US 2023/0036599 A1 Feb. 2, 2023

(51) Int. Cl.
*G06F 16/23* (2019.01)
*G06F 16/2455* (2019.01)
(Continued)

(52) U.S. Cl.
CPC .......... *G06F 21/56* (2013.01); *G06F 16/2379* (2019.01); *G06F 16/24552* (2019.01);
(Continued)

(58) Field of Classification Search
CPC ...... G06F 21/554; G06F 21/552; G06F 21/56; G06F 21/6218; G06F 16/23; G06F 16/2455; G06F 16/2379; G06F 16/24552
See application file for complete search history.

(56) References Cited

U.S. PATENT DOCUMENTS 8,893,278 B1 11/2014 Chechik
9,965,627 B2 * 5/2018 Ray ................ G06F 21/552
(Continued)

FOREIGN PATENT DOCUMENTS

KR 20190020998 A * 8/2017 ............ G06F 21/64
WO WO2020132137 A1 6/2020
WO WO2020136673 A1 7/2020

OTHER PUBLICATIONS

"Malware Analysis and Reverse Engineering"—Resource Center, Malware Analysis, INFOSEC, Aug. 12, 2019 https://www.infosecinstitute.com/resources/malware-analysis/malware-analysis-and-reverse-engineering/ (Year: 2019).*
(Continued)

*Primary Examiner* — Randy A Scott
(74) *Attorney, Agent, or Firm* — ESPE Legal Consultancy FZ-LLC

(57) ABSTRACT

A system and method for implementing management of a system context database is disclosed herein. The system context from a target computing system is collected. The system context is set in accordance with the configuration status of a context consumer. The context consumer includes one or more data security components. A system context database is initialized in response to the configuration status. The collected system context is restored in a cache. The attributes from the cache are provided to the context consumer where the attributes are compared with predefined attributes of the known malware threats. Each data security component of the context consumer is configured to access the cache in a synchronized manner to avoid duplication of the scanning process. The comparison result indicates the presence of a malware threat.

3 Claims, 7 Drawing Sheets

(51) Int. Cl.
    *G06F 21/56*     (2013.01)
    *G06F 21/55*     (2013.01)
    *G06F 21/62*     (2013.01)

(52) U.S. Cl.
    CPC ............ *G06F 16/23* (2019.01); *G06F 21/552* (2013.01); *G06F 21/554* (2013.01); *G06F 21/6218* (2013.01); *G06F 2221/034* (2013.01)

(56) References Cited

U.S. PATENT DOCUMENTS

| | | |
|---|---|---|
| 10,437,507 B2 | 10/2019 | Tormasov et al. |
| 10,817,542 B2 | 10/2020 | Aseev et al. |
| 10,902,114 B1 | 1/2021 | Trost et al. |
| 11,055,411 B2 | 7/2021 | Strogov et al. |
| 11,250,126 B2 | 2/2022 | Strogov et al. |
| 11,372,991 B1* | 6/2022 | Willett ................ G06F 21/6218 |
| 11,513,878 B2 | 11/2022 | Kulaga et al. |
| 2017/0214702 A1* | 7/2017 | Moscovici .......... H04W 12/106 |
| 2017/0286824 A1 | 10/2017 | Tormasov et al. |
| 2018/0276378 A1* | 9/2018 | Ray ..................... G06F 21/6218 |
| 2019/0222585 A1* | 7/2019 | Apple .................. G06F 21/566 |

OTHER PUBLICATIONS

"Enhancing Automated Malware Analysis Machines with Memory Analysis"—Teller et al., Security Innovation Group, Checkpoint Software Technologies, Aug. 2014 https://www.blackhat.com/docs/us-14/materials/arsenal/us-14-Teller-Automated-Memory-Analysis-WP.pdf (Year: 2014).*

* cited by examiner

SYSTEM CONTEXT DATABASE MANAGEMENT

FIELD OF THE INVENTION

The present disclosure generally relates to data security management, and particularly, but not limitedly, to a system and method for a system context database management by caching behavioral attributes and event data into a database which can directly be accessed by a context database consumer.

BACKGROUND

With ever-growing digitization, dependence on computing devices in every sector is reaching new highs every day. A user, whether a personal user or an enterprise network, uses one or more computing devices which are interconnected through various networks, including the Internet. As those devices may store critical data, such as data related to banking and finances, identity attributes, and private data related to the user, computer security against malware attacks has become critically important. Invasions or malware attacks come in different forms, that include computer viruses, computer worms, system component replacements, denial of service attacks, or even misuse or abuse of legitimate computer system features, all of which exploit one or more computer system vulnerabilities for illegitimate purposes. Definitions, characteristics, and attributes of malware attacks are technically distinct from one another and are normalized accordingly. However, as data security measurements are improving, malware threats are evolving too.

A computer system can be attacked or compromised by malware threats despite the presence of an anti-malware protection component. Adverse consequences vary according to the intention of the attack, including shutting down the computer system, disabling system devices, hacking potentially sensitive and critical data and exporting to another system over the network illegitimately, erasing or corrupting firmware, application data storage or data files, or causing the computer system to crash. Yet another pernicious aspect of many, though not all, malware attacks is that the compromised computer system may infect other computer systems that are communicatively connected by a network connection.

Currently many anti-malware software solutions are available commercially to prevent such malware attacks, and to detect the malware threats and take remedial actions. Anti-malware software is equipped with malware databases containing definitions and attributes of known malware threats. A computing system memory, application data storage, a data file, a script and such system features are scanned against the malware database to determine whether there is any malware threat matching the definition and attributes of the known malware threats from the malware database. There can be a predetermined threshold for the matching value, above which a potential threat can be identified as a malware threat.

Scanning computing system components for malware detection is a time and resource intensive process. Apart from resource consumption, time required for scanning and detection is crucial because the time taken for the detection leaves a user exposed to a greater risk and threat. For example, there is an enterprise network of an oil and gas company. Numerous computing devices from various serving departments of the company are interconnected over the enterprise network. The departments may include an intel data-providing cluster which is responsible for collecting and processing real time data pertaining to ongoing operations on an oil mining rig and assist the rig operations by providing correct intel and instructions in real time in order to process further operations. If the enterprise network is compromised, the attacker may steal sensitive data pertaining to ongoing operations on the rig. In another case, the intel providing systems may be shut down or may lose the sensitive data files. Until the malware attack is correctly identified, and remedial actions are taken, the rig operations, which are dependent on the intel provided by the intel data providing department, will be at risk. With each passing minute, the risk of sensitive-data theft will be increasing. In such a time sensitive environment, the malware detection and identification must be optimized such that the time and resources required for the scanning process are minimized.

SUMMARY

In an example of scanning process optimization, a cache that tracks the configuration of files on a computing device with regard to whether the files are infected with malware is implemented for scanning. Tracking the configuration of files from the cache or an equivalent mechanism prevents unnecessary scans from being performed. More specifically, usually when a file is scanned for malware, an attribute associated with the file, which is indicative of whether the file has been compromised, can be stored in the cache. Storing the attributes related to the file in the cache and scanning the cache instead of each file significantly reduces the time and resources required for malware scanning. As a result, the entire malware detection process is optimized.

Although systems are configured with a cache for optimizing the scanning process, the system has to be able to quickly determine which attributes should be stored in the cache. Event filtration should be associated with behavioral attributes of a system component subjected to malware scanning and should be identified and stored in the cache. For attribute selection, a set of predetermined rules can be applied for the verification process, and only unverified attributes can be stored in the cache. The un-verified attributes stored in cache can be accessed by a data security component for malware scanning.

Scanning of the system attributes subjected to event filtration and behavioral metrics is advantageous for optimized malware scanning in terms of time and resources required for the scanning. Various data security components can be configured as such to prevent repeated scanning of the same attribute.

Various embodiments and technical aspects disclosed herein relate to a system and method for system context database management by caching behavioral attributes and event data into a database which can directly be accessed by a context database consumer.

A method is implemented on a system having a system context aggregator. The system context aggregator is primarily configured to manage and operate a system context database of a target computing system. The term, target computing system herein should not be considered in a restrictive way as it does not limit to any specific computing system. Term refers to a computing device implemented in personal use capacity or in an enterprise network. The method, according to the present disclosure, is implemented to access a plurality of a system component and restore a system context database by the system context aggregator. The method is further implemented to enable a context consumer to access the system context and perform malware detection scanning and detection process on the computing device against a malware threat.

The context consumer herein is a set of one or more data security components implemented to enforce anti-malware functionality. Examples of the data security components include Indicators of Compromise (IOC) scanner, a telemetry analyzer, and a behavioral analyzer and the like. Each data security component may have a distinct objective and configuration than other components.

According to one embodiment, the method includes collecting a system context of the target computing system. The system context may typically include at least one of attribute, feature, and characteristic of system components that may include operating system services, a file system, a system registry, applications and the like. Typically, the attributes are associated with a behavior of the system component, a source of the system component, and a type of the system component. The attribute may be of at least one of a process, a function, an executable, a dynamic linked library, a script, a file, a data structure, a URL, and data.

In this particular method, the system context includes a first set of attributes of system context and behavioral metrics, and at least one event. The event is an action or occurrence which is identified and recognized by a system program that leads to attribute changes. In one example, the event could be user-generated, such as login, browsing, mouse clicking, and such. In another example, the event could be system generated, such as loading, downloading data, running out of memory, storing the data, and such. The behavioral metrics can be determined by the event.

According to an embodiment, the method further includes reading configuration data pertaining to one or more data-security components of the context consumer. In accordance with another aspect of the embodiment, the method further includes initializing the system context database of the target computing system in response to the configuration data of each data security component of the context consumer. Each data security component may have a distinct objective and configuration. In a response applicable to the context consumer configuration, the system context database is initialized to store attributes and events identified as related to the context consumer configuration.

In an embodiment, the method further includes implementing an event filter to filter one or more events, from amongst a plethora of events recorded by the various system components, based on configuration data of the data security components of the context consumer. In an example, if the IOC scanner is configured to scan the system context from the system context database, the event filter may be configured to apply event filtration rules for consolidating the events in response to IOC scanner configuration. In particular, the event that may contain IOC, such as downloading a file data, opening an ad content, clicking on a fishy link from an email and the like are identified and filtered.

In an embodiment, the method further includes restoring cache with at least one system context attribute provided by attribute provider 118. The cache is a non-persistent part of a storage component of the system context database. The cache is configured to at least one attribute of at least one system component. The attributes can include static data, such as a source of the security threat (e.g., a domain, URL, or IP address for the security threat), files associated with the security threat, file characteristics, scripting, regex, or other appropriate static characteristics of a security threat. The attributes can also include in-memory signatures or dynamic characteristics, such as those based on a behavioral profile, or network indicators. The attributes could also include a machine learning model, such as a neural network, support vector machine, or syntax tree which detects one or more threats.

In an embodiment, the method further includes processing an attribute request made by the context consumer for providing a first set of attributes to the context consumer. In one implementation of the embodiment, the context consumer is able to send the attribute request to the system context aggregator. Upon receiving such a request from the context consumer, the first set of the attributes is fetched from the cache. There can be a plurality of sets of attributes and each set of attributes may correspond to at least one data security component of the context consumer. In one aspect of the embodiment, the context consumer is configured to request the sets of attributes corresponding to each data security component. Each data security component is further configured to access the system context to process the corresponding set of attributes in a synchronized manner. Accessing the system context in a synchronized manner by each security data component avoids duplicate scanning of the same set of attributes, resulting in a more effective and optimized scanning process.

In an embodiment, the method further includes comparing the first set of attributes of the system context with a second set of attributes stored in a threat database of each of the one or more data security components of the context consumer for detecting a malicious activity. In one implementation, each data security component may include a database particularly adapted to the data security component. The database may include definitions, signatures, and attributes indicative of a threat or malicious thread. In another implementation, the context consumer may include a common database that supports multiple formats of the definitions, signatures, and attributes indicative of a threat or malicious thread. According to one aspect of the embodiment, the second set of attributes is fetched from the context consumer database. The first set of attributes fetched from the system context database is compared with the second set of attributes fetched from the context consumer database. The comparison result is measured against a predetermined threshold level. The comparison result exceeding the predetermined level of the threshold is indicative of malware detection.

BRIEF DESCRIPTION OF DRAWINGS

A better understanding of embodiments of the present disclosure (including alternatives and/or variations thereof) may be obtained with reference to the detailed description of the embodiments along with the following drawings, in which.

DETAILED DESCRIPTION

In general, this disclosure describes systems, methods, devices, and other techniques for managing a system context database. The system generates a system context database to store data in a cache that might be indicative of a malware threat. The data is accessed through the cache by a context consumer to be compared with prestored data defining the definition, signature and characteristics of the known malware threats.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

In the following description, it is understood that terms such as "first," "second," "above," "below," and the like, are words of convenience and are not to be construed as limiting terms unless expressly states otherwise.

Figure 1:
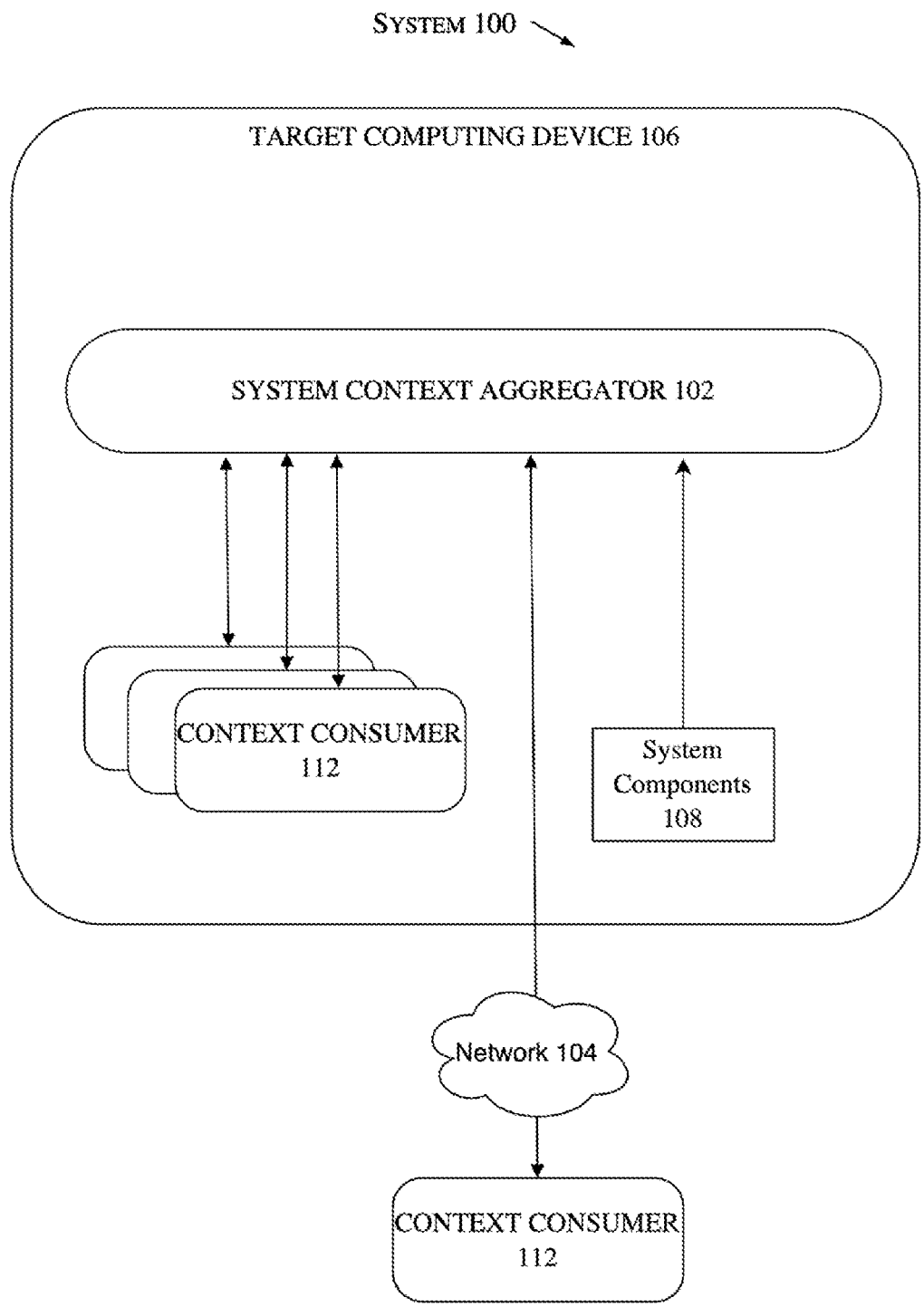
FIG. 1 illustrates an exemplary environment for implementation of a system for management of the system context database, according to an embodiment of the present disclosure.

In an embodiment, FIG. 1 depicts an exemplary environment for implementing a system 100 for system context database management, referred to as the system 100 hereinafter, implemented on a target computing device 106. The system 100 includes a system context aggregator 102 which is communicatively connected to a context consumer 112 and a system component 108. The system context aggregator 102 is configured to collect a system context from the system component 108 unit and provide that to the context consumer 112.

The system 100 is implemented to protect the target device from computer-based malware, including viruses, spyware, adware, Trojans, intrusion, spam, policy abuse, uncontrolled access, and the like. To detect the malware, the system context is scanned against the known malware definitions. The system context, in one implementation may comprise the attributes, the event data and the behavioral metrics derived from the system component 108s. The system context, in one another embodiment may comprise the attributes, the event data and the behavioral metrics collected according to attribute list, event list and behavioral metrics list, defined by context consumer, optimizing the volume of stored and processed system context.

The attributes received from the system component 108s, such as operating system service 108a, a file system 108b, a system registry 108c, an application 108d and the like, may include static data, such as a source of the security threat (e.g., a domain, URL, or IP address for the security threat), files associated with the security threat, file characteristics, scripting, regex, or other appropriate static characteristics of a security threat. The attributes can also include in-memory signatures, dynamic characteristics, such as based on a behavioral profile, or network indicators. The attributes could also include a machine learning model, such as a neural network, support vector machine, or syntax tree which detects one or more threats. The attributes are provided to the context consumer 112 for scanning or searching process.

The context consumer 112 includes a set of data security components. Security components can include a behavior analyzer, signature based analyzer, IoC (Indicator of Compromise) scanner, IoA (Indicator of Attack) scanner, Firewall, network traffic analyzer, email protection solution, data leakage prevention solution, application control system, antimalware security system and other security systems. Each data security component may contain a threat database against which the attributes are compared to determine whether the target system has been compromised or not. The context consumer 112 is communicatively coupled to the system context aggregator 102.

In yet another embodiment, the context consumer is running on a dedicated computing system and is communicatively coupled to the system context aggregator 102 via a network 104.

Examples of the network 104 include, without limitation, in accordance with the present embodiment, a Wide Area Network 104 (WAN), the Internet, a mobile telephone network 104 (e.g., CDMA, GSM, NDAC, TDMA, E-TDMA, NAMPS, WCDMA, CDMA-2000, UMTS, 3G, 4G), (e.g., PON), a public network 104, a private network 104, or other wired or wireless communications network 104 configured to carry data. Computing devices and network 104s also may support wireless wide area network 104 (WWAN) communications service 108as including Internet access.

The target computing device 106 may be a computing device having a processor, such as including at least one or more laptops, desktops, servers, gateways, communication ports, handheld or mobile devices implemented in personal or entity capacity, such as corporate, commercial, educational, governmental, or the like. The network may be distributed amongst a plurality of computing devices and plurality of geographical locations. The target computing device 106 is exposed to malware risk from a plurality of sources, such as from network threats, physical proximity threats, secondary location threats, and the like. The computing device may pick up the threat when interfacing with an unprotected server through the Internet.

The target computing device 106, in one example, may be an individual and personal computing device. In another example, the target computing device 106 may be a device connected over an enterprise network. For example, a user, named Karen, is an employee of XYZ Company. Karen is provided with a laptop to manage her professional work by the company and the laptop is connected over an enterprise network of the XYZ company. Karen has received an email, from an unauthorized source, containing a link. Karen clicks on the link which starts downloading a suspicious file from an unknown network. The file contains a malware thread, which upon downloading the file, launches a malware attack compromising Karen's laptop. The malware thread may attack on one or more system components 108, for example, an operating system. Once Karen's laptop has been compromised, other computing devices and peripheral devices, such as printers, connected over the enterprise network of the XYZ company are also exposed to the malware threat.

The system implemented at the enterprise network may request attributes from Karen's laptop. It would be understood by a person skilled in the art that the system would comprehensively launch a scanning process for the malware detection, however, to optimize the scanning process, the attributes indicative of malware threats, such as source, may be identified before. The attributes can be identified in conjunction with an event filter. For example, in this instance, downloading the link was an event. The event can be reported along with the attributes of the infected operating system. The system can process the attributes received by the operating system in conjunction with the event and enable the context consumer 112 to access the attributes. The context consumer 112 can compare the attributes against a threat database, created using known definitions, signatures and attributes related to the malware threats. The comparison result will indicate whether the laptop has been compromised or not. The system is thus configured to manage the system context database 120 for optimized scanning process of system context. The system includes various components described in subsequent descriptions with reference to the figures.

Figure 2:
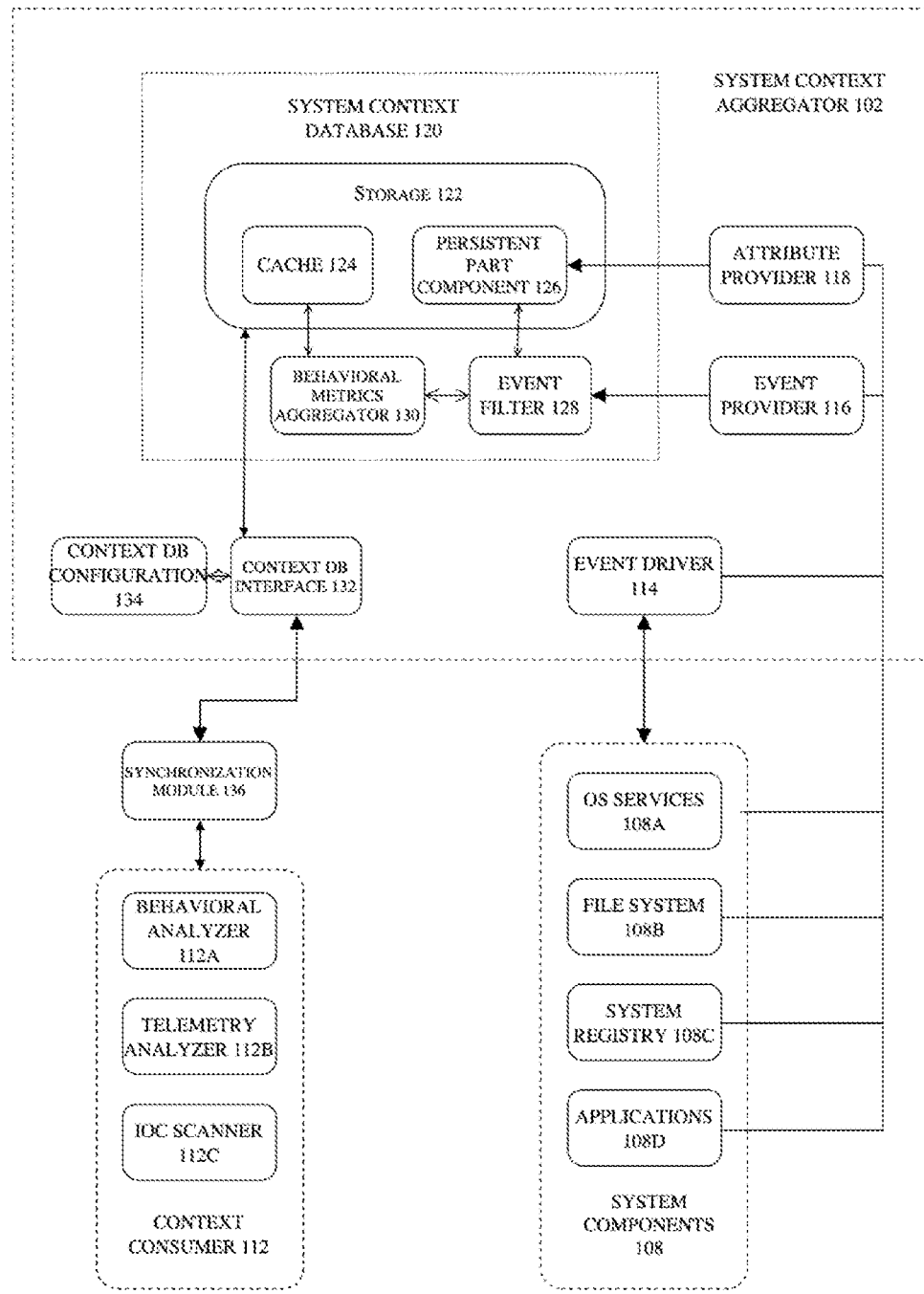
FIG. 2 illustrates a function block diagram of the system, according to an embodiment of the present disclosure.

FIG. 2 describes a functional diagram of the system for managing the system context, in accordance with one embodiment. As shown in the figure, the system mainly includes, but may not be limited to, a system component unit 108, a system context aggregator 102, and a context consumer 112.

The system component 108 unit is cluster of a plurality of system components 108, that may include, but may not be limited to, an operating system service 108a, a file system 108b, a system registry 108c, applications 108d, and the like, implemented to execute functionality of a respective computing system.

The operating system is implemented on a computing system mainly for i) providing service 108as to a user for executing the programs in a convenient manner, and ii) providing an environment to program for execution of the programmable instructions. The examples of the service 108as provided by the operating service 108as include, but may not be limited to, a program execution, Input Output Operations, a file system 108b manipulation, communication, error detection, resource allocation and protection.

The file, as a person skilled in the art would interpret, is a collection of related information that is recorded on secondary storage 122. The information is stored in a sequence of bits, bytes, lines, or records with a specific meaning known to the file creator and user. The file system 108b can be of multiple types. Each file system 108b may have different structure and logic, properties of speed, flexibility, security, size and more. General examples of the file attributes may include, but may not be limited to, attributes of the file system 108b can be file names, dates and times, filename extensions, file system 108b permissions, archive, hidden, compressed, read-only, directory, system, not content indexed, hash sum of a part or of the whole file, and the like.

The system registry 108c is a hierarchical database that stores low-level settings for the operating system and for application 108ds that opt to use the registry. In other words, the system registry 108c is a database utilized to store settings, options, and preferences regarding the operation of a computing device, including settings for all the hardware and user preferences. The system registry 108c also stores references to the operating system and application programs installed on a computing device. The kernel, device drivers, services, Security Accounts Manager, and user interface can all use the registry. The registry also allows access to counters for profiling system performance.

Attributes of the system registry 108c can monitor for specific values or changes in registry data. General examples of the registry attribute include, but may not be limited to path name, string name, and root key name.

An application 108d can be an application 108d program or application 108d software implemented on the operating system. Examples of applications 108d include, without limitation, word processors, database programs, web browsers, development tools, image editors and communication platforms. Applications 108d use the computer's operating system and other supporting programs, typically system software, to operate.

Each system component 108, as mentioned above, may get infected with a malware threat, spyware, viruses, adware, Trojans, intrusion, spam, policy abuse, uncontrolled access, and the like. Attributes of each system component 108 can indicate the presence of a malware attack. Therefore, the system is configured to collect the attributes from each system component 108s to scan the attributes in order to identify the definition and characteristics of the suspected malware attack. A first set of attributes are collected by the system context aggregator 102 from at least one system component 108.

The system context aggregator 102 is a component mainly configured to collect the attributes and events from the system components 108, filter the events and prepare a single real time index based upon a behavioral metrics and store the filtered data, and enable the context consumer 112 to access the stored data for malware detection. The system context aggregator 102, according to the embodiment, is combination of a hardware and programmable components which mainly serves as a volatile and non-volatile storage 122, filters and rules applicators, and communication interface 132.

As shown in the figure, the system context aggregator 102 mainly includes, but may not be limited to, an event driver 114, an event provider 116, an attribute provider 118, a context database interface 132, a context database configuration unit 134, and a system context database 120.

An event driver 114 is the component configured to determine and extract a plurality of events from the system components 108. The event data can be derived from multiplicity of system components 108, or subcomponents of the system components 108, such as web servers, application 108d servers, databases, firewalls, routers, operating systems, and software applications that execute on computer systems, and the like. The event data generated by such data sources can include, but may not be limited to, server log files, activity log files, configuration files, messages, network packet data, performance measurements, and the like. The event data is indicative of change in current status or the operation of a system component 108.

The event provider 116 is a component configured to collect the event data from the event driver 114 and convert the event data in required format for providing it the system context database 120. The event provider 116 can support multiple events that includes, but may not be limited to, i) filesystem related events, such as creating, modification, deletion, encryption, access rights change of the files, ii) registry related events, creating, modification, deletion, and the like, and iii) process and thread related events, such as creating, modification, deletion, connection, RPC calls, memory change, access rights change and the like.

In accordance with the present disclosure, the system context aggregator 102 is configured to process the event data in conjunction with the attributes received from the system components 108. The attributes will be collected related to a corresponding event occurred at the respective system component 108, and the event data and the attributes are processed in association with each other to render the optimization of a scanning process.

The attribute provider 118 is the component configured for providing at least a first set of attributes, procured from at least one system component 108, to the system context aggregator 102. The attribute provider 118 is configured to support one or more attribute types, that includes, but may not be limited to, set of registry keys, a set of directories, a set of file names, a list of process names, set of strings extracted by PE (portable executables), aggregated metrics of process behavior, a list of executable names, a list of applications, named kernel objects, and the like. In an illustrative example, the first set of attributes may be an extracted feature vector. For example, the first set of attributes may include one or more n-gram vectors indicating occurrences of character pairs in printable characters representing a first file. As another example, the first set of attributes may include a sequence of entropy indicators, each entropy indicator of the sequence of entropy indicators corresponding to a chunk of the first file. In further illustrative examples, the attributes can be a hash function for mapping event data describing events that have occurred at any system component 108. In this example, when a computer processes the hash function, the hash function may cause the computer to map event data to characteristics of security threats.

As described in FIG. 2, the system context database 120 further includes a storage 122 having a cache 124 and a persistent part component 126, a behavioral metric aggregator 130, and an event filter 128. The event filter 128 is a component configured to filter the events by the respective content. The event filter 128 can be applied with a set of rules derived by the configuration of the context consumer 112 and the behavioral metrics aggregator 130. The behavioral metric aggregator 130 is a component configured to compute behavioral metrics.

The first set of attributes, the event data, and the behavioral metrics are stored in the storage 122. The storage 122 further includes a volatile component, referred as to a cache 124 hereinafter, and a non-volatile component, referred as to a persistent part component 126 hereinafter. The cache 124 can be implemented in a form of distributed cache 124, such as a cluster-based cache 124 or a peer-to-peer cache 124. For example, the cache 124 can be implemented in REDIS, an open-source key-value cache 124. The first set of attributes is stored in cache 124.

The persistent part component 126 is a storage for long-term data storing and data analysis. The persistent part component 126 is mainly provided to store the data for backward analysis. In one example, if the requested attributes are not found in the cache 124, the persistent part component 126 is accessed to fetch the attributes. If the attributes are found in the persistent part component, the attributes are restored in the cache 124.

As shown in the FIG. 2, the context database interface 132 is implemented between the system context aggregator 102 and the context consumer 112 to establish communication between both. Context database interface 132 in couple with system context database 120 processes multiple data requests from all context consumers for system context stored in cache 124 and persistent part component 126. Context database interface 132 in couple with system context database 120 supports parallel request processing, data routing, optimizing the load of the storage and increasing the speed of delivering system context to context consumer 112.

The context consumer 112 is a collaborative unit including one or more data security components. The examples of the data security components may include, but may not be limited to Behavioral analyzer, a telemetry analyzer, and IOC scanner. The context consumer 112 generates a second set of attributes. The second set of attributes can be generated by at least one data security component that defines known definition and characteristics of the malware threats. The first set of attributes received by the context consumer 112 is compared against the second set of attributes.

The behavioral analyzer 112a is configured to collect observations and behavioral information related to the event. The behavioral analyzer 112a, in general include hierarchical temporal memory processes that employ modified probabilistic suffix trees (PST), collaborative filtering, content-based recommendation analysis, statistical matches in whitelists and blacklists using text models, entropy/randomness/n-gram analysis for uniform resource locators (e.g., URLs), other network 104 resource locators and domains (AGDs), or any combination thereof. The behavioral analyzer 112a, employed as a data security component, may include a database containing observations and behavioral information pertaining to malware threats. A set of behavior metrics can be defined based on the observations and behavioral information stored in the database, and the set of behavior metrics can be provided to the behavioral metrics aggregator 130 to store the behavior metrics data in the storage 122 accordingly.

The telemetry analyzer 112b collects telemetry data and analyses the same. The term telemetry data can, in general, refer to data collected from the system component 108s that may have previously encountered a suspected malware file. The telemetry data can include data describing at least one event detected at the computing system. The telemetry data may include one or more characteristics of malware threats. Examples of telemetry data include, without limitation, (1) system configuration information from one or more computing systems targeted by the file, (2) behavior observed when the file was previously executed, (3) the results of previous static analysis, or (4) previously constructed execution profiles. The telemetry analyzer 112b contains a malware database with static analysis, behavioral observations, and execution profiles. The telemetry data received from the system context aggregator 102 can be compared against the malware database to determine and identify the presence of the malware threat.

IOC scanner 112c is configured to receive the attributes identifying IOC and compare the attribute against an IOC database. IOCs are of different formats, such as ioc, yar, csv, xml, txt, json, Rules, Stix, and others. Different types of IOCs are aggregated at various free community driven platforms that are constantly updated with IoC in listed formats, thereby providing quality threat intelligence to the data security community in order to render efficient threat databases to be used in conjunction with human intelligence. There are multiple rules for identifying IOC attributes and classifying malware samples. One example of a tool of such rules is YARA, using which the user can create descriptions of malware classification based on textual or binary patterns. Each YARA rule defines a set of strings and a Boolean expression which determines its logic. The IOC attributes described herein serve as the second set of the attributes.

Each data security component as described above may have its own configuration and a threat database. Based on the configuration status, the set of rules for event filtration are applied. Each data security component can access the first set of attributes from the cache 124. A synchronization module is provided to allow each data security component to access the cache 124 in a synchronized manner. The Synchronization module is configured to enable each component to access the cache 124 in such a manner that no attribute will be scanned twice.

By avoiding duplication of the scanning process, time and resources required for the scanning can be saved significantly. Moreover, as the attributes are stored in the cache 124 in selective methods, such as by configuration by the context consumer 112; it saves scanning of irrelevant attributes, resulting in optimized and quick scanning of the relevant attributes which further results in quicker detection of the malware threat.

Figure 3:
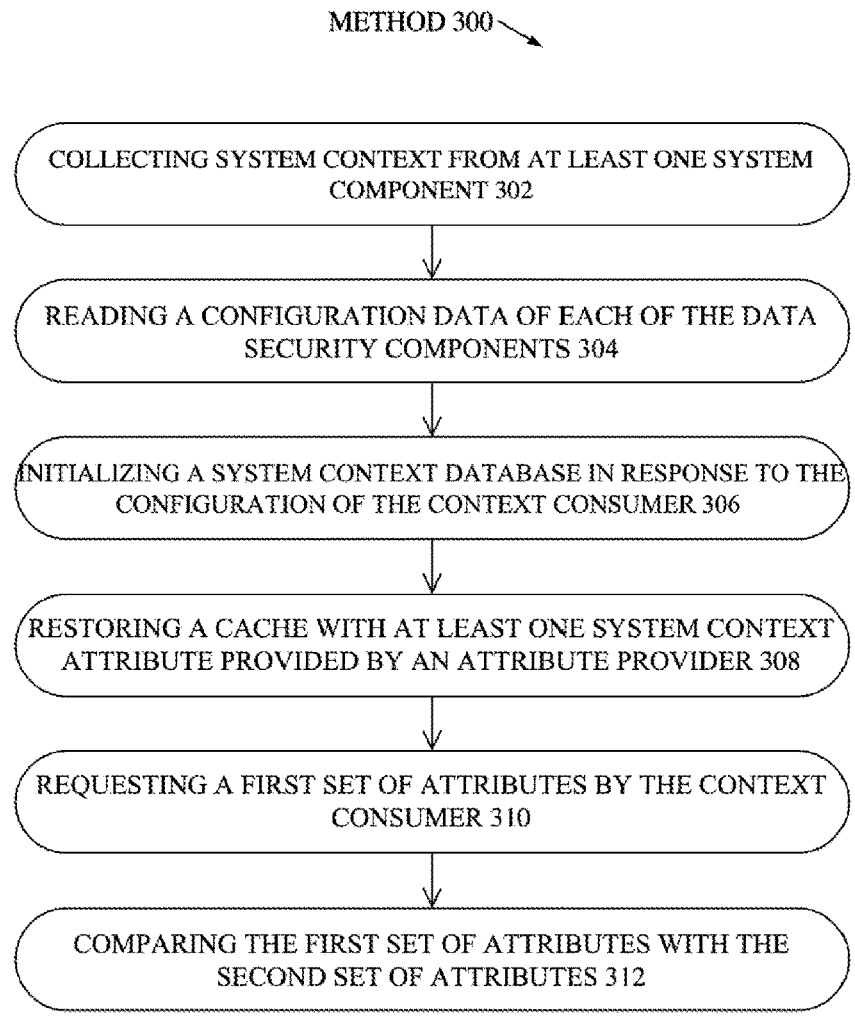
FIG. 3 illustrates a method diagram for implementing management of the system context database, according to an embodiment of the present disclosure.

FIG. 3 illustrates a method 300 for implementing management of a system context database 120. At block 302, the method step includes collecting a system context of a target computing system. The system context is fetched from a one or more system component 108s of the target computing system and includes system context that can indicate a potential malware threat. The system context mainly includes a first set of attributes, event data, and behavioral metrics. The collective information including the first set of attributes which are fetched from a respective system component 108, the event occurred at the system component 108 that caused the change in attribute value, and behavioral metric that collects observations and behavioral information about the event provides most probable dataset indicative of the malware threat, as the events and attributes are picked as a system context based on a set of rules derived from a configuration data provided by the context consumer 112.

At block 304, the method step includes reading a configuration data of each of the data security components. The configuration data may include behavioral data, telemetry data, IOC attribute data and the like.

At block 306, the method step includes initializing a system context database 120 of the target computing system in response to the configuration of the context consumer 112. For example, if an IOC scanner is in operational mode, the first set of attributes would be a set of attributes indicating presence of IOCs and related information. The event data will be filtered to apply a set of rules to filter the events that may have led to occurrence of the IOCs. The behaviors metric observes and computes the behavioral information related to IOC occurrence. Therefore, based on the configuration of the context consumer 112, the system context aggregator 102 can generate the system context.

At block 308, the method step includes restoring a cache 124 with at least one system context attribute provided by an attribute provider 118. The cache 124 is implemented herein specifically to provide the context consumer 112 with quick access to the data indicative of a malware threat. Instead of scanning each file, a set of attributes that defines the change in the file, can be scanned.

At block 310, the method step includes requesting a first set of attributes by the context consumer 112. The data security components of the context consumer 112 include a respective database from where a second set of attributes is derived. The second set of attributes defines known definitions and characteristics of the malware threats. The first set of attributes is requested from the system context to be compared with the second set of attributes.

At block 312, the method step includes comparing the first set of attributes with the second set of attributes. As described earlier, the first set of attributes denote the potential malware threat that may be present in the system component 108s, and the second set of attributes denotes the known definitions and characteristics of the known malware threats. By comparing both sets malware threat can be detected. There can be a predetermined threshold level, if the comparison result exceeds the threshold level, presence of the malware threat can be detected.

Figure 4:
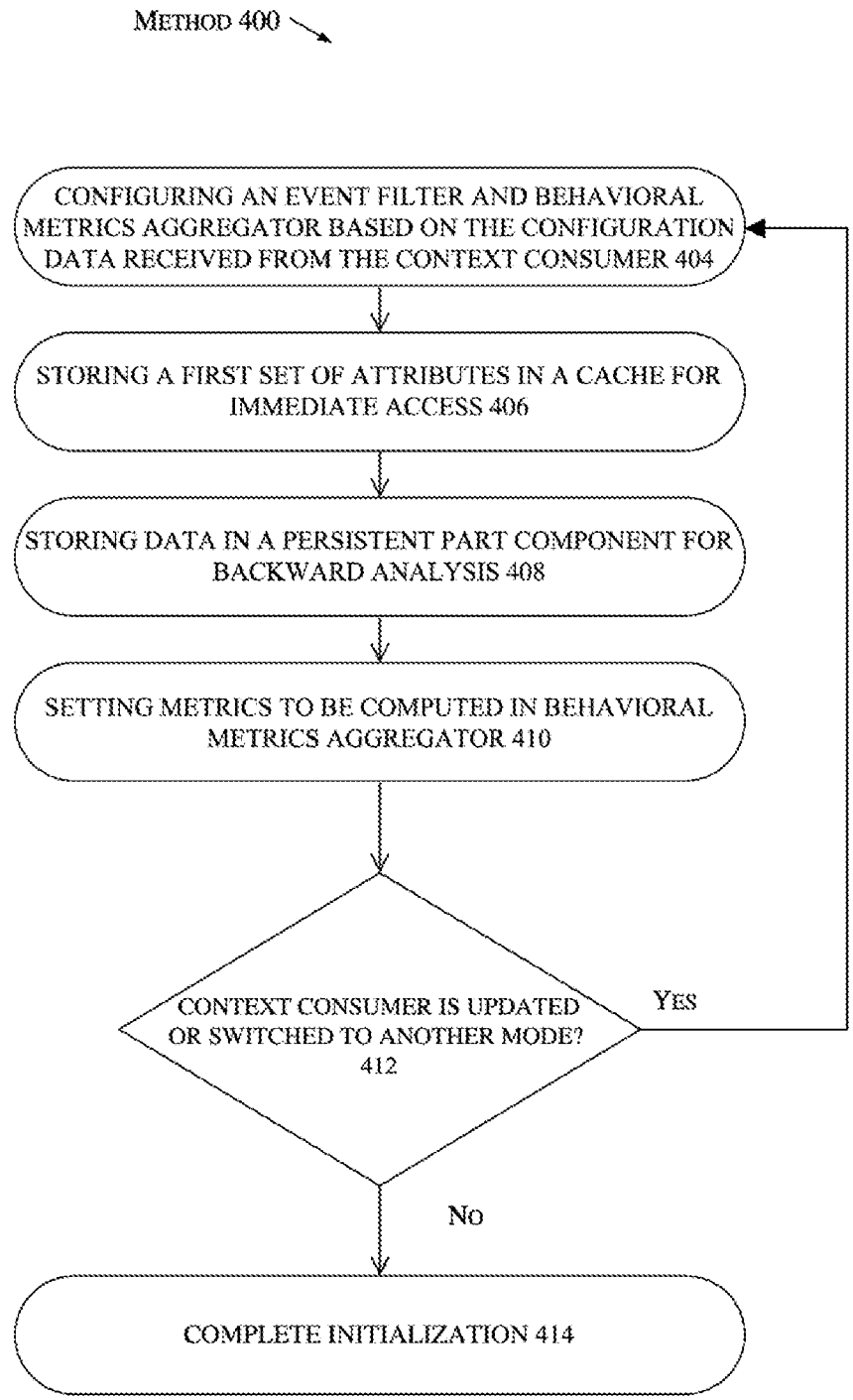
FIG. 4 illustrates a method diagram of the process of initializing a system context database, according to an embodiment of the present disclosure.

FIG. 4 elaborates a method 400 step of initialization of the system context database 120. At the block 402, the method step includes reading configuration from the context consumer 112. At block 404, the method step includes configuring an event filter 128 and behavioral metrics aggregator 130 based on the configuration data received from the context consumer 112. As described earlier, based on the data security component and its configuration, a set of rules can be derived and applied to the event and behavioral metrics aggregator. In accordance with the event filter 128, an attribute provider 118, and the behavioral metric aggregator, at block 406, the data is stored in a cache 124 for immediate access. At block 408, the data is stored in a persistent part component 126 for backward analysis. At block 410, the method step includes setting metrics to be computed in a behavioral metrics aggregator. At block 412, a configuration data status is confirmed again, the configuration of the context consumer 112 has not been changed, the initialization process is completed at the block 414. If the context consumer 112 mode is updated or switched, the initialization process will have to be started from the block 404.

Figure 5:
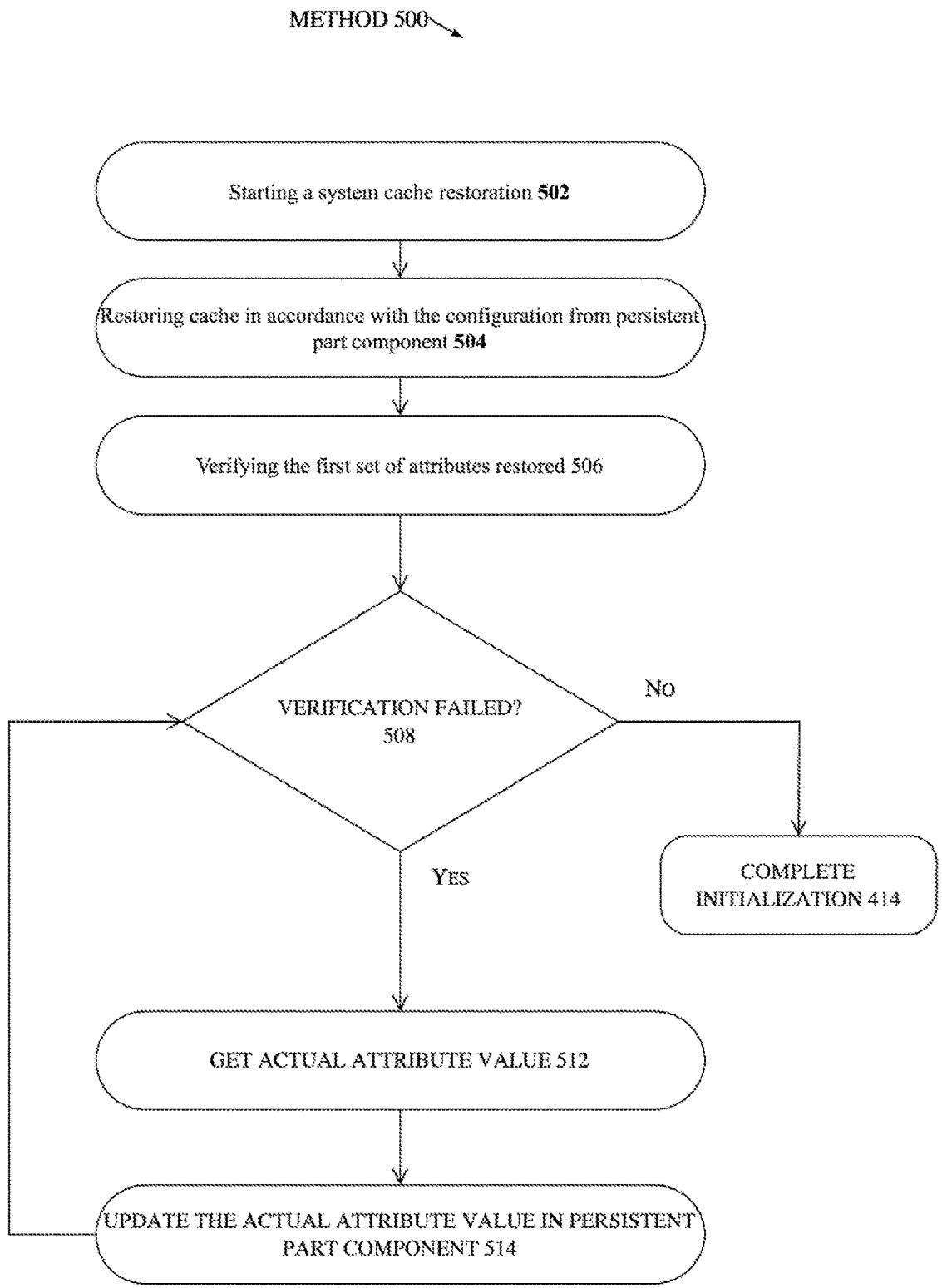
FIG. 5 illustrates a method diagram of the process of restoring a cache, according to an embodiment of the present disclosure.

FIG. 5 illustrates elaborative method steps of the cache 124 restoration. At the block 502, the method step includes starting a system cache 124 restoration. At block 504, the method step includes restoring cache 124 in accordance with the configuration from the persistent part component 126. The cache 124 component is restored to provide immediate access of the data to the context consumer 112 and the persistent part component 126 is restored for backward analysis of the data. At block 506, the method step includes verifying the first set of attributes restored. At block 508, it is determined if the first set of attributes cannot be verified, the cache will be updated with actual attributes values from the attribute provider 118 512. If verification of the first set of attributes is successful, the initialization completes 414. At block 514, the actual attribute values are updated in the persistent part component 126.

Figure 6:
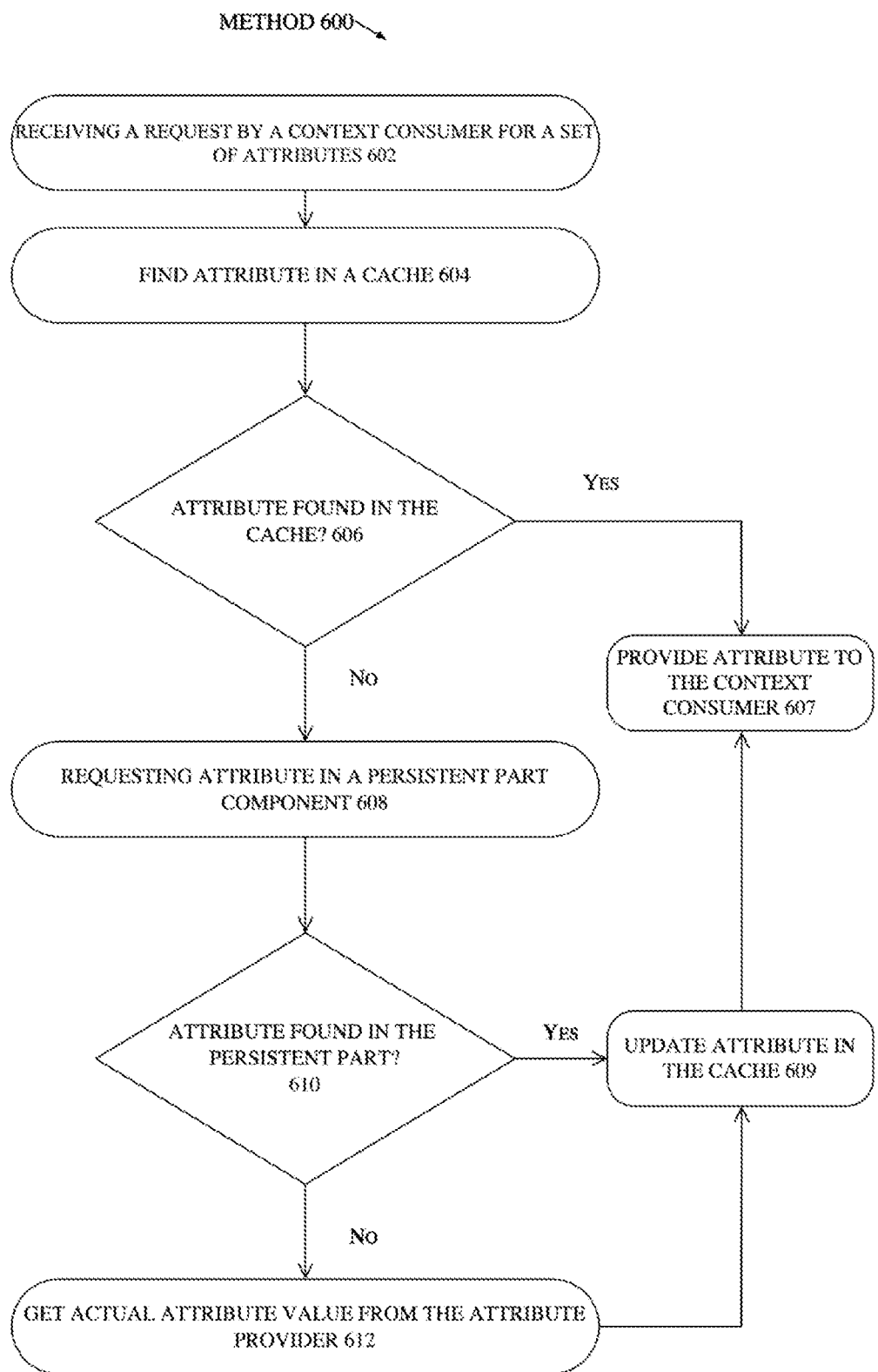
FIG. 6 illustrates a method diagram of processing an attribute request, according to an embodiment of the present disclosure.

FIG. 6 describes an elaborated method step of attribute request processing 600. At block 602, the method step includes receiving a request by a context consumer 112 for a set of attributes. The requested first set of attributes is searched in the cache 124 at block 604. If the first set of attributes is present in the cache 124 606, it is provided to the context consumer 112 through the context consumer interface 132 at block 607. If the first set of attributes is not found in the cache 124, the attributes are searched in the persistent part component 126 at block 608. At block 609, if the first set of attributes is found in the persistent part component 126 610, the cache 124 is restored with the found attributes and from the first set of attributes is provided to the context consumer 112. If the first set of attributes is not found in the persistent part component 126 as well, the actual attribute value of the missed first set of attributes is requested and retrieved from the attribute provider 118 and provided to the context consumer 112.

Figure 7:
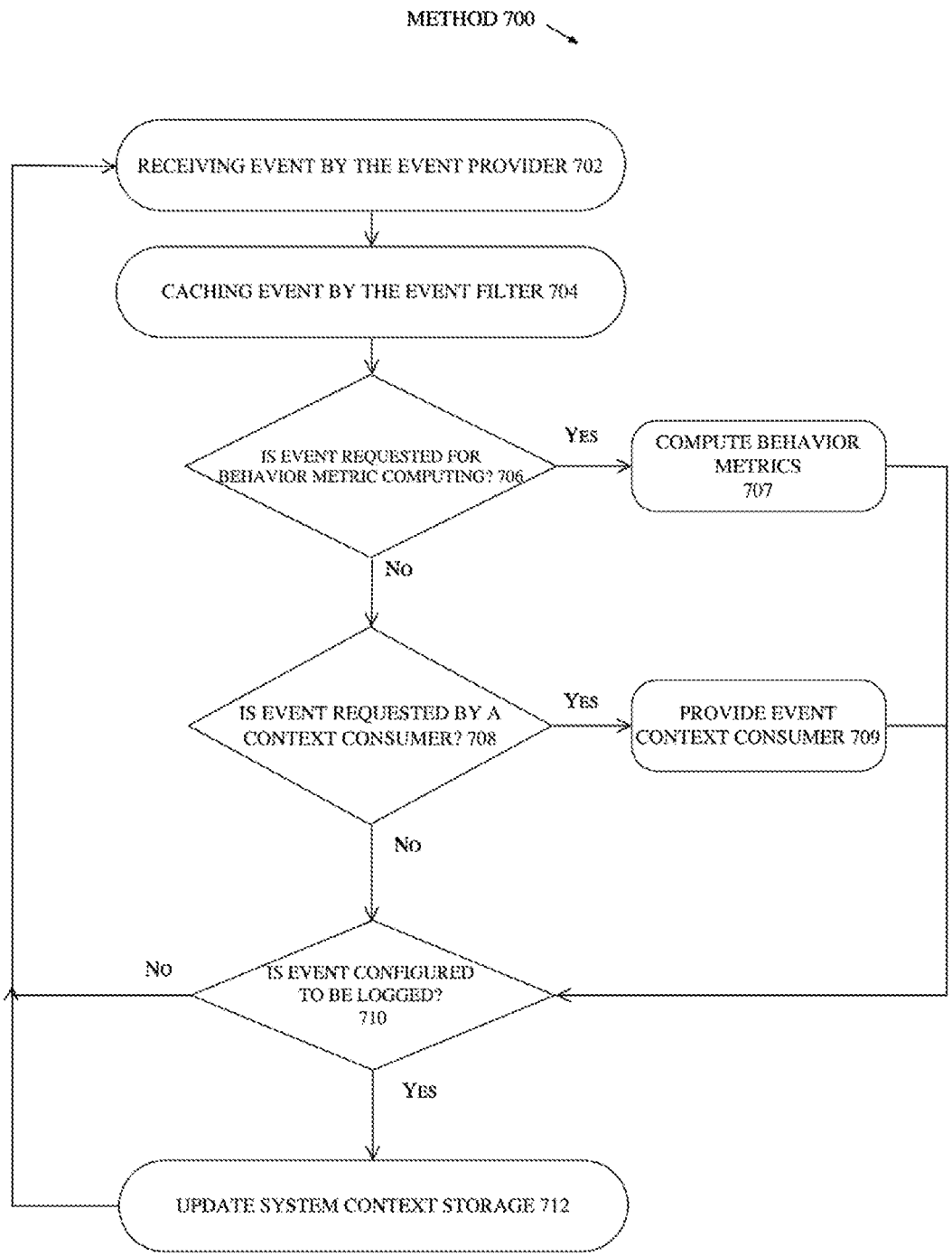
FIG. 7 illustrates a method diagram of event processing, according to an embodiment of the present disclosure.

FIG. 7 describes an elaborated method step of event processing 700. At block 702, the method step includes receiving at least one event from an event provider 116. At step 704 the events are filtered and cashed by an event filter 128 by applying a set of rules derived from the configuration data of the context consumer 112. At block 706, it is determined if the event is used for behavior metrics computing. If yes 707, the event data is provided to the behavioral metrics aggregator 130, and further it is determined if the event is configured to be logged. If not, at block 708, it is further determined if the event is requested by the context consumer 112. If the event is requested, the event data is provided to the context consumer 112 709, and further it is determined if the event is configured to be logged 710. If not, it is further determined that if the event is configured to be logged 710. If an event is configured to be logged, the system context storage 122 is updated accordingly. The event processing method continues from block 702.

It should be understood by the person skilled in the art and others that the aforementioned description is presented to describe preferred embodiments and implementation of the system context database 120 management, which should not be considered in a restrictive manner. The scanning process is significantly optimized by combining events and OS attributes into a single real-time system index. Index contains metrics, attributes and data from events required by the context consumer 112 and is accessible for multiple usage from the cache 124, which is the fastest interface 132 for processing. Ability of the context consumer to access the cache in synchronized manner render the system more effective as the duplicate scanning can be avoided.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for detecting malicious activity in a target computing system having a cache storage and a persistent storage, the method comprising:
    collecting a system context of a target computing system from one or more system components of the target computing system, wherein the system context comprises a first set of attributes;
    storing the system context in the cache storage;
    initializing a system context database of the target computing system;
    requesting, by a context consumer, the first set of attributes in the cache storage, wherein the context consumer comprises a data security component;
    wherein each of the one or more data security components of the context consumer are configured to access the system context in a synchronized manner;
    providing the requested first set of attributes to the context consumer if the requested first set of attributes is in the cache storage;
    comparing, by the data security component of the context consumer, the requested first set of attributes of the target-computing-system event reporting the presence of malware if the first set of attributes matches the second set of attributes;
    storing the first set of attributes of a system event in the persistent storage for backward analysis;
    removing the first set of attributes from cache storage; and
    restoring the first set of attributes to the cache storage if the context consumer requests the first set of attributes when those attributes are no longer in cache storage.

2. The method as claimed in claim 1, further comprising:
    verifying the restored first set of attributes;
    monitoring a verification status and a cache restoration status of the first set of attributes, wherein if the verification is successful, the cache restoration status is identified as complete, and wherein if the verification fails for any attribute in the first set of attributes, a replacement attribute value is retrieved from an attribute provider for the attribute value that failed verification; and
    updating the first set of attributes in the persistent storage to include the replacement attribute.

3. A system for detecting malware in a target computing system by analyzing cached data, the system comprising:
    a processor with a memory and nonvolatile storage;
    a plurality of system components;
    a system context aggregator under control of the processor;
    a system context database in communication with the system context aggregator and having a cache storage for immediate access and a persistent part component for backward analysis of a first set of attributes of a system event of the target computing system, wherein the system context database is configured to store in the cache storage the first set of attributes of the system event of the target computing system from one of the plurality of system components,
    an attribute provider for providing an attribute of a system component to the cache storage of the system context database;
    a context consumer, having a data security component coupled to a threat detection database;
    wherein the context consumer is configured to request the first set of attributes from the cache storage, receive the first set of attributes from the cache storage through a context database interface, and compare the first set of attributes with a second set of attributes from the threat detection database to detect malicious activity; and
    a plurality of context consumers;
    wherein the system context aggregator further comprises a context database configuration unit coupled to a context database interface;
    wherein the context database interface is communicatively coupled to the cache storage and the plurality of context consumers; and
    wherein the context database interface is configured to process parallel requests from the plurality of context consumers for data in cache storage.

* * * * *